United States Patent
Bitto et al.

(10) Patent No.: US 7,325,461 B2
(45) Date of Patent: Feb. 5, 2008

(54) MEASUREMENT TRANSDUCER OF VIBRATION-TYPE

(75) Inventors: Ennio Bitto, Aesch (CH); Gerhard Eckert, Rheinfelden (DE); Sergej Lopatin, Lörrach (DE); Christian Matt, Aesch (CH); Helmut Pfeiffer, Steinen (DE); Alfred Rieder, Landshut (DE); Martin Anklin-Imhof, Dornach (CH); Martin Stucki, Pratteln (CH)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 11/634,087

(22) Filed: Dec. 6, 2006

(65) Prior Publication Data

US 2007/0151369 A1    Jul. 5, 2007

Related U.S. Application Data

(60) Provisional application No. 60/748,163, filed on Dec. 8, 2005.

(30) Foreign Application Priority Data

Dec. 8, 2005    (DE) .................... 10 2005 059 070

(51) Int. Cl.
*G01F 1/84* (2006.01)
(52) U.S. Cl. .................................. 73/861.355
(58) Field of Classification Search ........... 73/861.355, 73/861.356, 861.357
See application file for complete search history.

(56) References Cited

U.S. PATENT DOCUMENTS 4,711,132 A * 12/1987 Dahlin .................. 73/861.356

4,876,898 A * 10/1989 Cage et al. ............ 73/861.355

(Continued)

FOREIGN PATENT DOCUMENTS

DE    35 03841 A1    8/1986

(Continued)

OTHER PUBLICATIONS

US 6,044,715, 04/2000, Ollila (withdrawn)

*Primary Examiner*—Jewel Thompson
(74) *Attorney, Agent, or Firm*—Bacon & Thomas, PLLC

(57) ABSTRACT

The measurement transducer includes at least two oscillatably held transducer tubes vibrating, at least at times, during operation, of which at least one transducer tube serving to convey at least a volume portion of a medium to be measured, communicates with a pipeline; as well as at least one transducer element for converting electrical energy into mechanical and/or vice versa. The two transducer tubes are mechanically coupled together by means of at least one, inlet-side, coupling element and by means of at least one, outlet-side, coupling element in such a manner that both the inlet-side coupling element, as well as also the outlet-side coupling element, are subjected during operation repeatedly to deformations which correspond to vibrations of at least one of the two transducer tubes for converting electrical energy into mechanical, oscillatory energy and/or vice versa. The transducer element, especially a transducer element formed by means of a piezoelectric, deformation body, and at least one of the coupling elements, are, at least mediately, mechanically coupled together in such a manner that the transducer element executes, at least in part, oscillatory movements, which correspond with the repeated deformations at least of this coupling element.

21 Claims, 9 Drawing Sheets

U.S. PATENT DOCUMENTS

| | | |
|---|---|---|
| 5,024,104 A | 6/1991 | Dames |
| 5,054,322 A | 10/1991 | Lew |
| 5,226,330 A | 7/1993 | Lew |
| 5,301,557 A | 4/1994 | Cage |
| 5,370,002 A | 12/1994 | Normen |
| 5,540,106 A * | 7/1996 | Lew et al. ............. 73/861.356 |
| 5,549,009 A | 8/1996 | Zaschel |
| 5,734,112 A | 3/1998 | Bose |
| 5,796,011 A | 8/1998 | Keita |
| 5,918,285 A | 6/1999 | Vander Pol |
| 6,092,429 A | 7/2000 | Cunningham |
| 6,301,973 B1 | 10/2001 | Smith |
| 6,308,580 B1 | 10/2001 | Crisfield |
| 6,412,354 B1 | 7/2002 | Birchak |
| 6,450,042 B1 | 9/2002 | Lanham |
| 6,526,839 B1 | 3/2003 | Barger |
| 6,666,098 B2 | 12/2003 | Drahm |
| 6,711,958 B2 | 3/2004 | Bitto |
| 6,776,052 B2 | 8/2004 | Crisfield |
| 6,802,224 B2 | 10/2004 | Nakao |
| 6,883,387 B2 | 4/2005 | Bitto |
| 6,920,798 B2 | 7/2005 | Wenger |
| 6,957,587 B2 | 10/2005 | Bitto |
| 6,997,033 B2 | 2/2006 | Schlosser |
| 7,134,347 B2 | 11/2006 | Bitto |
| 2004/0261528 A1 | 12/2004 | Drahm |
| 2005/0166661 A1 | 8/2005 | Schlosser |
| 2005/0228598 A1 | 10/2005 | Matt |
| 2006/0016273 A1 | 1/2006 | Bitto |

FOREIGN PATENT DOCUMENTS

| | | |
|---|---|---|
| EP | 0 462 711 A1 | 12/1991 |
| EP | 0 324 019 | 1/1993 |
| EP | 0 553 939 | 8/1993 |
| EP | 1 001 254 | 5/2000 |
| EP | 1 260 798 | 11/2002 |
| EP | 1 421 349 | 5/2004 |
| EP | 1 448 956 | 8/2004 |
| FR | 2 449 872 | 9/1980 |
| JP | 11 108724 | 4/1999 |
| WO | WO 98/07009 | 2/1998 |
| WO | WO 00/57141 | 9/2000 |
| WO | WO 01/33174 A1 | 5/2001 |
| WO | WO 01/65213 | 9/2001 |
| WO | WO 02/088641 | 11/2002 |
| WO | WO 03/21202 | 3/2003 |
| WO | WO 03/027616 | 4/2003 |
| WO | WO 03/076879 | 9/2003 |
| WO | WO 2004/038341 | 5/2004 |
| WO | WO 2004/083785 | 9/2004 |
| WO | WO 2005/111550 | 11/2005 |

* cited by examiner

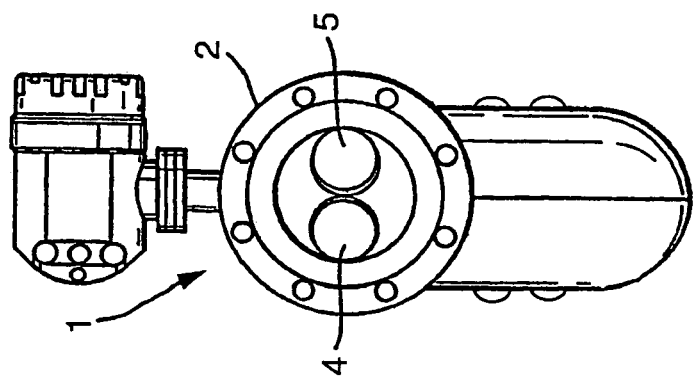
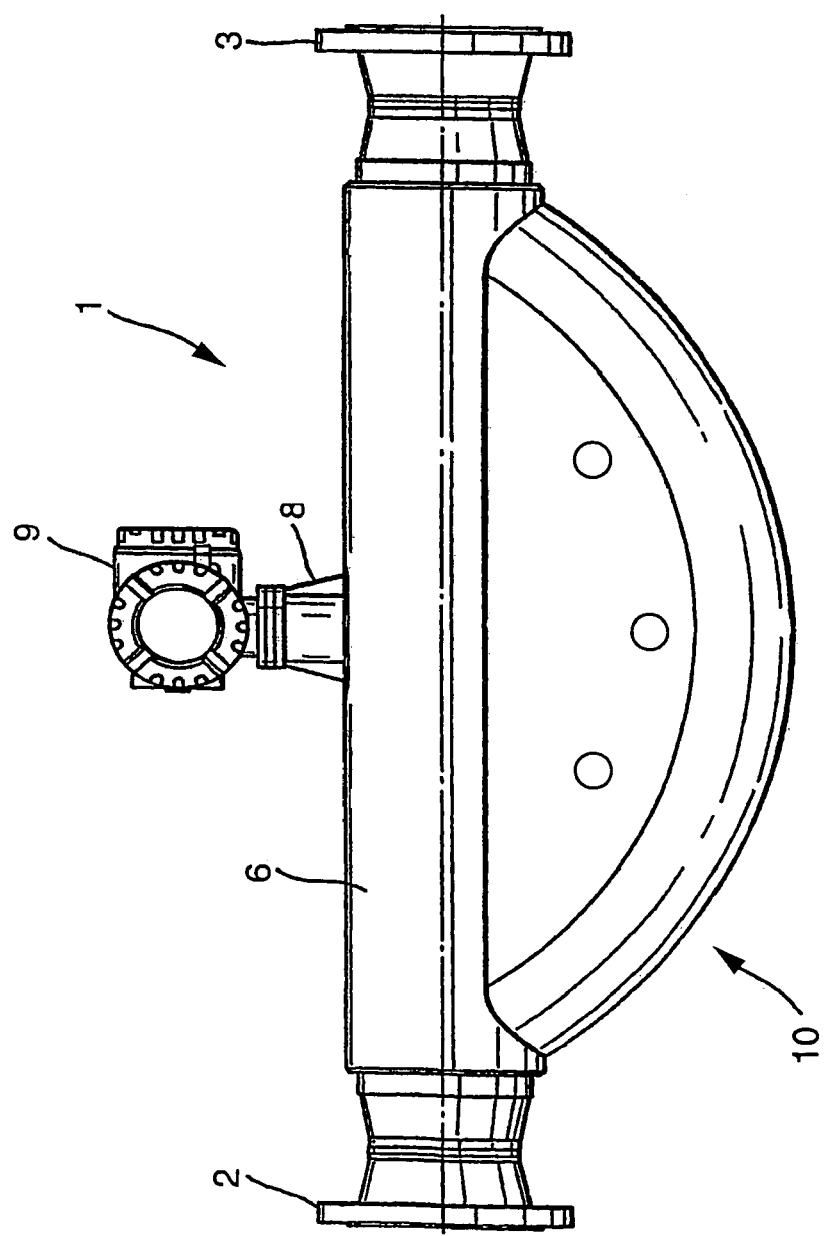
Fig. 1b
Fig. 1a

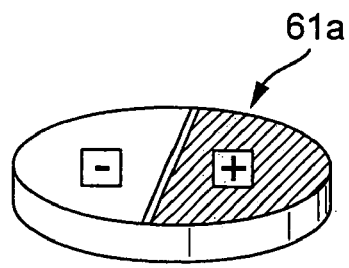
Fig. 7a
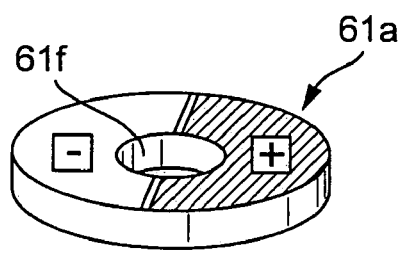
Fig. 7b
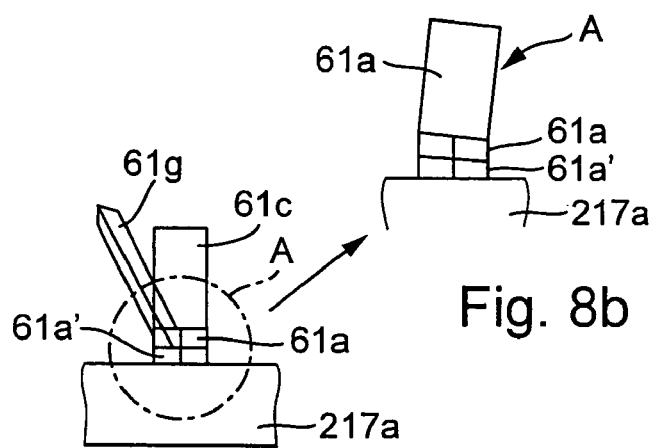
Fig. 8a
Fig. 8b
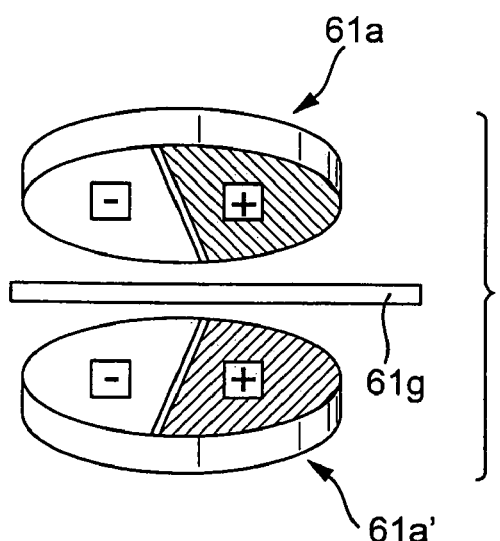
Fig. 9a
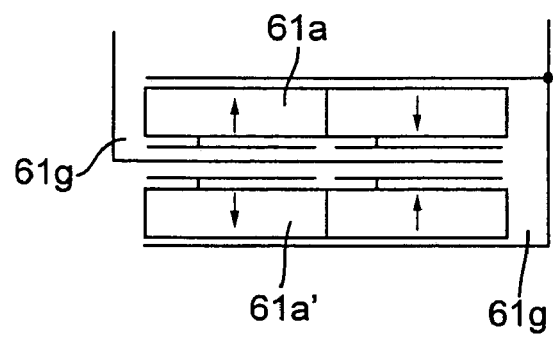
Fig. 9b

| Kraft | Signal |
|---|---|
| ⬇⬆ | 0 |
| ⬅➡ | 0 |
| ↗↙ | 0 |
| ⬇⬆⬅➡ | 2-E |

MEASUREMENT TRANSDUCER OF VIBRATION-TYPE

This application is a Nonprovisional of U.S. Provisional Application No. 60/748,163 filed on Dec. 8, 2005, which claims priority of German Application 10 2005 05 9070.5 filed on Dec. 8, 2005.

FIELD OF THE INVENTION

The invention relates to a measurement transducer, or transducer, of vibration-type for measuring a flowable medium conveyed in a pipeline, especially a gas, liquid, powder, or other flowable substance.

BACKGROUND OF THE INVENTION

In process measurements and automation technology, for the measurement of physical parameters, such as e.g. mass flow, density and/or viscosity of a medium flowing in a pipeline, often such inline measuring devices are used, which, by means of a measurement transducer of vibration-type, through which the medium flows, and a measuring device electronics connected thereto, effect reaction forces in the medium, forces such as e.g. Coriolis forces corresponding with the mass flow, inertial forces corresponding with the density of the medium and/or frictional forces corresponding with the viscosity of the medium, and which produce, derived from these forces, a measurement signal representing the respective mass flow, viscosity and/or density of the medium.

Mostly, the measuring device electronics is also so designed that during operation the inline measuring device can exchange measurement and/or other operational data via a data transmission system with a measured value processing unit, for example, a programmable logic controller (PLC), a personal computer and/or a workstation. Furthermore, the measuring device electronics is so designed that it can be fed by an external energy, or power, supply. Therefore, the measuring device electronics has, additionally, a corresponding communications interface e.g. for transmitting the measured data to the aforementioned programmable logic controller and/or superordinated process control system. Serving as transmission systems are usually fieldbus systems, for example Profibus or Foundation Fieldbus systems, etc., with which both the energy supply and the data communications can be implemented.

Measurement transducers of the described kind, especially those embodied as Coriolis mass flow meters or Coriolis mass flow/density meters are described comprehensively and in detail e.g. in WO-A 05/111550, WO-A 04/083785, WO-A 04/038341, WO-A 03/076879, WO-A 03/027616, WO-A 03/021202, WO-A 02/088641, WO-A 01/33174, WO-A 00/57141, WO-A 98/07009, U.S. Pat. Nos. 6,711,958, 6,666,098, 6,526,839, 6,412,354, 6,308,580, 6,301,973, 6,092,429, 5,918,285, 5,796,011, 5,370,002, 5,301,557, 5,226,330, 5,024,104, 4,876,898, EP-A 553 939, EP-A 1 001 254, EP-A 1 448 956 or EP-A 1 421 349. For conveying the, at least at times, flowing medium, the measurement transducers include in each case at least one transducer tube held in a mostly thick walled, especially tubular and/or beam-like, support cylinder or support frame. The transducer tube is caused to vibrate during operation for producing the aforementioned reaction forces, driven by an electromechanical exciter mechanism. For registering vibrations of the transducer tube, especially on its inlet side and its outlet side, and for producing at least one oscillation measurement signal representing these, such measurement transducers include, additionally, in each case, a sensor arrangement reacting to movements, and thus also to mechanical oscillations, of the transducer tube.

During operation, the above described inner oscillation system of the measurement transducer formed by the at least one transducer tube, the medium conveyed at least instantaneously therein, and at least in part by the exciter mechanism and the sensor arrangement is excited by means of the electromechanical exciter mechanism, at least at times, into a wanted oscillation mode to execute mechanical oscillations at least one dominant, wanted, oscillation frequency. These oscillations in the so-called wanted mode are, especially in the case of use of the measurement transducer as a Coriolis mass flow and/or density meter, developed at least in part as lateral oscillations. The wanted oscillation frequency is, in such case, usually a natural, instantaneous, resonance frequency of the inner oscillation system, which in turn depends both on size, shape and material of the transducer tube, as well as also on an instantaneous density of the medium; as required, the wanted oscillation frequency can also be influenced significantly by an instantaneous viscosity of the medium. As a result of fluctuating density of the medium to be measured and/or as a result of medium changes effected during operation, the wanted oscillation frequency is variable during operation of the measurement transducer, according to its nature, at least within a calibrated and, as a result, predetermined oscillation frequency band, which correspondingly has a predetermined lower, and a predetermined upper, limit frequency. The inner oscillation system of the measurement transducer formed by the at least one transducer tube, as well as the exciter mechanism and the sensor arrangement is furthermore usually placed in a transducer housing having as integral component the support frame or support cylinder as the case may be. Transducer housings appropriately suitable for measurement transducers of vibration-type are described for example in WO-A 03/076879, WO-A 03/021202, WO-A 01/65213, WO-A 00/57141, U.S. Pat. Nos. 6,776,052, 6,711, 958, 6,044,715, 5,301,557 or EP-A 1 001 254.

Oscillation exciters and oscillation sensors are components of the measurement transducer and are, for the accuracy of measurement, of decisive importance, both with respect to their mechanical, as well as also with respect to their electrical, ability to withstand disturbances. The more so, since the exciter mechanism and sensor arrangement are mostly directly exposed, based on the operating principles of measurement transducers of the described kind, to oscillations of the transducer tube. As a result of this, they are subjected not only to increased mechanical loads but also, due to the movement of lines conveying electrical current, mostly also to considerable electrical disturbing influences. Moreover, as discussed for example in U.S. Pat. No. 4,876, 898 or in WO-A 04/083785, high, and/or strongly fluctuating, operating temperatures can have a considerable influence on the accuracy of measurement, especially, however, also on the mechanical integrity of exciter mechanism and/or sensor arrangement.

SUMMARY OF THE INVENTION

Starting with the above described state of the art, an object of the invention, therefore, is to improve the construction of the exciter mechanism and/or sensor arrangement of measurement transducers of the described kind such that they in each case have a relatively simple, mechanically robust, construction and are, equally, largely resistant to disturbances. For achieving the object, the invention resides in a measurement transducer of vibration-type for measuring a flowable medium conveyed in a pipeline. The measurement transducer includes: At least two oscillatably held transducer tubes vibrating, at least at times, during operation, of which at least a first transducer tube, serving for conveying at least a volume portion of the medium to be measured, communicates with the pipeline; as well as at least a first transducer element which serves for converging electrical energy into mechanical energy and/or for converting mechanical energy into electrical. The two transducer tubes are mechanically coupled with one another by means of at least a first, inlet-side, coupling element and by means of at least a first, outlet-side, coupling element in such a manner that both the first, inlet-side, coupling element, as well as also the first, outlet-side, coupling element, are subjected during operation repeatedly to deformations which correspond with vibrations of at least one of the two transducer tubes. Furthermore, the first transducer element and at least one of the coupling elements are at least mediately coupled together mechanically in such a manner that the transducer element executes, at least in part, oscillatory movements which correspond with the repeated deformations of at least this coupling element.

In a first embodiment of the measurement transducer of the invention, the transducer element and the coupling element are mechanically coupled together in such a manner that the deformations to which each of the at least two coupling elements are repeatedly subjected during operation are at least in part developed in such a manner that oscillatory movements of the respective coupling elements corresponding therewith are directed at least partially transversely to an oscillatory direction of the two vibrating transducer tubes.

In a second embodiment of the measurement transducer of the invention, the first transducer element is essentially rigidly connected at least with the one of the at least two coupling elements.

In a third embodiment of the measurement transducer of the invention, each of the two coupling elements is embodied as a node plate affixed in each case to the two transducer tubes.

In a fourth embodiment of the measurement transducer of the invention, the transducer element and the coupling element are mechanically coupled together in such a manner that the deformations to which each of the two coupling elements is repeatedly subjected are developed as transverse-force-free bendings.

In a fifth embodiment of the measurement transducer of the invention, the first transducer element is coupled with the one of the at least two coupling elements in such a manner that the first transducer element executes, at least in part, oscillatory movements which follow, essentially in phase, deformation movements of a section of the same coupling element located between the two transducer tubes.

In a sixth embodiment of the measurement transducer of the invention, the first transducer element is coupled with the one of the two coupling elements in such a manner that it is essentially rigidly connected with the section of the coupling element lying between the two transducer tubes.

In a seventh embodiment of the measurement transducer of the invention, the two transducer tubes are mechanically coupled together by means of at least a second, inlet-side, coupling element and by means of at least a second, outlet-side, coupling element.

In an eighth embodiment of the measurement transducer of the invention, the first transducer element and two of the coupling elements are at least mediately mechanically coupled together.

In a ninth embodiment of the measurement transducer of the invention, the first transducer element includes an armature of magnetic material mechanically coupled with one of the coupling elements, as well as a coil mechanically coupled with another of the coupling elements, with armature and coil being penetrated at least partially by a magnetic field.

In a tenth embodiment of the measurement transducer of the invention, the first transducer element includes at least one deformation body made, at least in part, of piezoelectric material.

In an eleventh embodiment of the measurement transducer of the invention, the first transducer element includes at least two deformation bodies made at least in part of piezoelectric material placed on the first coupling element and coupled with seismic masses on a side facing away from the coupling element and/or essentially rigidly connected together by means of an essentially bend-proof, connecting piece.

In a twelfth embodiment of the measurement transducer of the invention, the first transducer element includes at least one deformation body made at least in part of piezoelectric material placed in a clamping apparatus on the first coupling element and/or clamped into a clamping apparatus worked into the coupling element.

In a thirteenth embodiment of the invention, the measurement transducer additionally includes a first distributor piece connecting the first and second transducer tubes on the inlet side together, as well as a second distributor piece connecting the first and second transducer tubes together on the outlet side.

In a fourteenth embodiment of the invention, the measurement transducer further includes a support element, especially an essentially rigid support element, with at least one of the two transducer tubes being mechanically connected on the inlet side, i.e. toward its inlet end, and on the outlet side, i.e. toward its outlet end, with the support element. The support element can in such case be embodied as a support cylinder, especially an essentially tubular support cylinder.

In a fifteenth embodiment of the measurement transducer of the invention, each of the two transducer tubes includes, in each case, at least one bent tube segment, especially an essentially U- or V-shaped tube segment.

In a sixteenth embodiment of the measurement transducer of the invention, the two transducer tubes are essentially identical and/or extend essentially parallel to one another.

In a seventeenth embodiment of the measurement transducer of the invention, the first transducer element serves, at least at times, as an oscillation exciter for the production and/or maintaining, at least at times, of mechanical oscillations of at least one of the transducer tubes.

In an eighteenth embodiment of the measurement transducer of the invention, the first transducer element serves, at least at times, as an oscillation sensor for the production, at least at times, of at least one oscillation measurement signal which represents at least oscillations of at least one of the vibrating transducer tubes.

In a nineteenth embodiment of the invention, the measurement transducer further includes at least a second transducer element for converting electrical energy into mechanical energy and/or vice versa, with the second transducer element and one of the coupling elements being mechanically coupled together, at least mediately, in such a manner that the second transducer element executes, at least in part, oscillatory movements corresponding with the repeated deformations of the same coupling element.

In a twentieth embodiment of the measurement transducer of the invention, the first transducer element is mechanically coupled with at least the first, inlet-side, coupling element and the second transducer element is mechanically coupled with at least the first, outlet-side, coupling element. In a further development of this embodiment of the invention, the first transducer element and the second transducer element are embodied essentially with equal construction.

A basic idea of the invention is to effect the transformation of electrical energy into mechanical oscillatory energy or of mechanical oscillatory energy into electrical energy, as required by the principle of measurement, in such a manner that, instead of a direct, immediate transmission between the oscillating transducer tubes and the exciter mechanism and/or the sensor arrangement, an indirect transmission is utilized via end-side coupling elements. Investigations have in such case shown that the operationally compelled deformations, in comparison to those of the transducer tubes, do, it is true, turn out to be smaller, but, however, especially in the case of use of piezoelectric or piezoresistive deformation bodies for the energy conversion, are, in fact, mostly so developed, that a very effective and active exciting and/or detection of mechanical oscillations of the transducer tubes can be realized.

An advantage of the invention is, among other things, that, apart from the node plates required anyway, no additional components need to be affixed directly to the operationally vibrating transducer tubes. At least, the usual, mostly very complicated mounting of the oscillation exciter and sensors to the transducer tubes can be quite easily omitted. In other words, the measurement transducers can be so embodied that the freely oscillating lengths of the two transducer tubes extending between the two inner most coupling elements embodied mostly as node plates and to such extent defining the, at least one, measuring tube can be kept free of additional, add-on parts, especially free of conventional oscillation exciters and/or sensors. Furthermore, the transducer tubes can, because of the end-side and thereby really indirect oscillation excitation or detection, as the case may be, be so designed that they exhibit an essentially homogenous mass distribution practically over the entire freely oscillating length. As a result of this, the oscillations of the transducer tubes are largely less disturbed than in the case of conventional measurement transducers, where the sensor arrangement and/or exciter mechanism directly engage in the oscillatory form of the vibrating transducer tubes. Moreover, the so-implemented sensor arrangements and/or exciter mechanisms are, because of their relatively simple construction, also correspondingly cost favorable to manufacture and assemble. Additionally, the transducer elements can be embodied very stably and robustly, especially in the case of use of piezoelectric or piezoresistive deformation bodies for energy conversion.

Additionally, in this way, also the lines electrically connecting the exciter mechanism and/or the sensor arrangement with the measuring device electronics can, as required, also without additional aiding constructions, be so directed that they can be affixed to, relative to the exciter mechanism and/or sensor arrangement, essentially quiet components of the measurement transducer.

BRIEF DESCRIPTION OF THE DRAWINGS

The invention will now be explained in greater detail on the basis of examples of embodiments and the figures of the drawing. Functionally equal parts are provided in the individual figures with equal reference characters, which are, however, only repeated in subsequent figures when such seems helpful. The figures show as follows:

FIG. 1a is a side view of an inline measuring device, for example one serving as a Coriolis-flow/density/viscosity meter, including a measurement transducer of vibration-type, in different side views;

FIG. 1b is a front view of an inline measuring device, for example one serving as a Coriolis-flow/density/viscosity meter, including a measurement transducer of vibration-type, in different side views;

FIGS. 7a, 7b show embodiments of the construction of a deformation body suitable for application in a transducer element of FIGS. 6a-6f and having in each case two differently polarized piezoelectric segments;

FIGS. 8a, 8b show by way of example, the production of a wagging movement using a transducer element formed by means of two stacked, piezoelectric, deformation bodies;

FIGS. 9a, 9b show an arrangement of two piezoelectric deformation bodies stacked one on the other according to FIG. 8a with, in each case, two differently polarized segments;

DETAILED DESCRIPTION OF EXEMPLARY EMBODIMENTS

Figure 2:
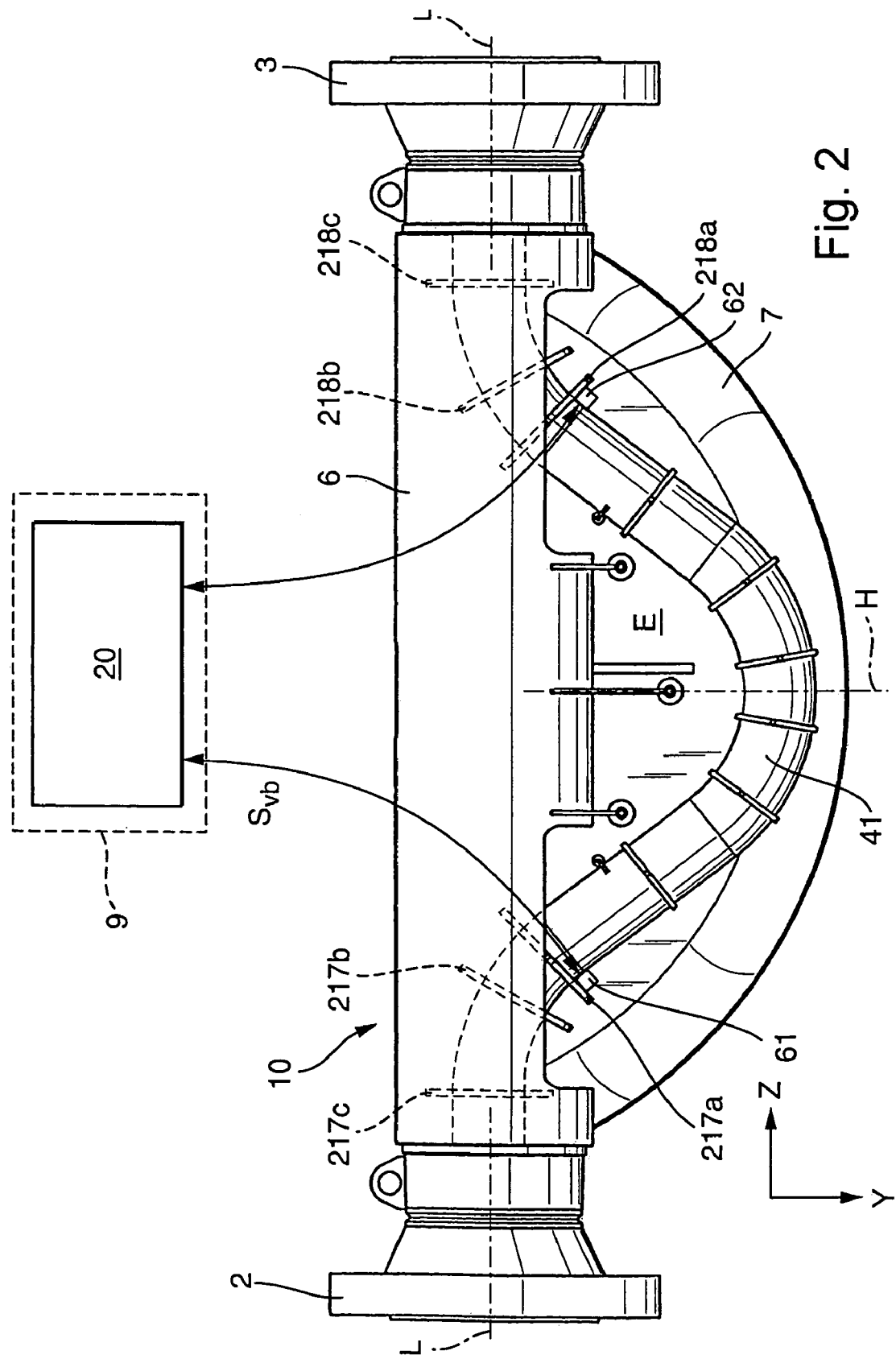
FIG. 2 is a partially sectioned, side view, showing details of a measurement transducer of vibration-type having two transducer tubes and being suited for an inline measuring device as shown in FIGS. 1a, 1b.

While the invention is susceptible to various modifications and alternative forms, exemplary embodiments thereof have been shown by way of example in the drawings and will herein be described in detail. It should be understood, however, that there is no intent to limit the invention to the particular forms disclosed, but on the contrary, the intention is to cover all modifications, equivalents, and alternatives falling within the spirit and scope of the invention as defined by the intended claims.

FIGS. 1a, b show an inline measuring device 1, especially an inline measuring device 1 embodied as a Coriolis mass flow and/or density measuring device, serving for registering a mass flow m, e.g. a mass flow rate, of a medium flowing in a pipeline (not shown) and for mapping such into a mass-flow, measured value $X_m$ instantaneously representing this mass flow. The medium can be practically any flowable substance, for example, a powder, a liquid, a gas, a vapor, or the like. Alternatively, or in supplementation, the inline measuring device 1 can, as required, also be applied for measuring a density $\rho$ and/or a viscosity $\eta$. The inline measuring device 1 includes for such purpose a measurement transducer, or transducer, 10 of vibration-type through which the medium to be measured flows during operation, as well as a measuring device electronics 20 electrically connected with the measurement transducer 10 and here not shown in detail, but instead merely schematically as a circuit block. Advantageously, the measuring device electronics is so designed that it can exchange, during operation of the inline measuring device 1, measurement and/or other operational data with a measured value processing unit superordinated thereto, for example, a programmable logic controller (PLC), a personal computer and/or a workstation. Furthermore, the measuring device electronics is so designed that it can be fed by an external energy, or power, supply, for example, also via the aforementioned fieldbus system. For the case in which the inline measuring device is provided for coupling to a fieldbus or other communication system, the measuring device electronics 20, especially one which is programmable, includes, additionally, a corresponding communications interface for data communications, e.g. for the transmission of the measurement data to the already mentioned, programmable logic controller or a superordinated, process control system.

Figure 3:
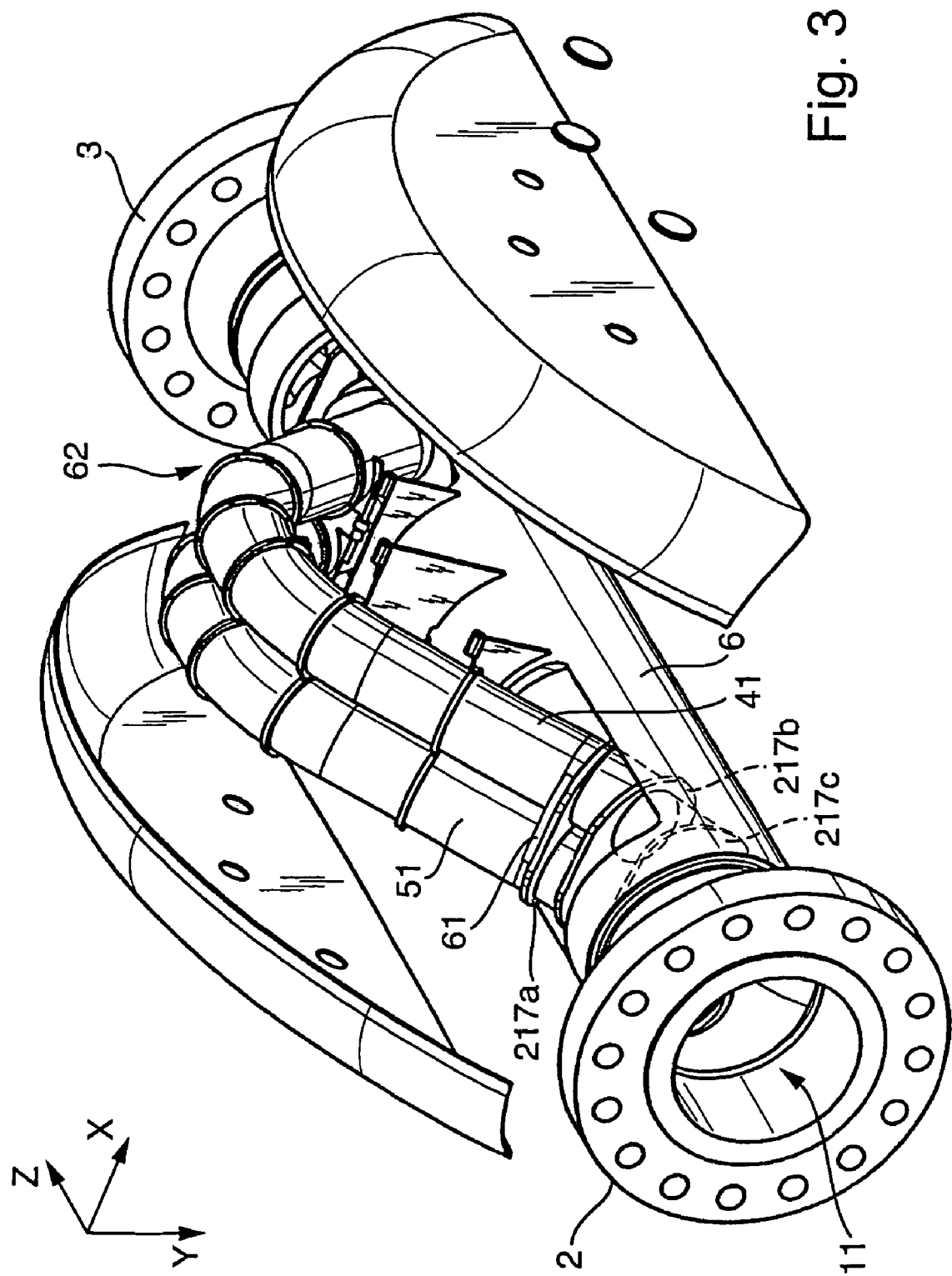
FIG. 3 is a partially exploded perspective of a measurement transducer of vibration-type having two transducer tubes and being suited for an inline measuring device as shown in FIGS. 1a, 1b.
Figure 4:
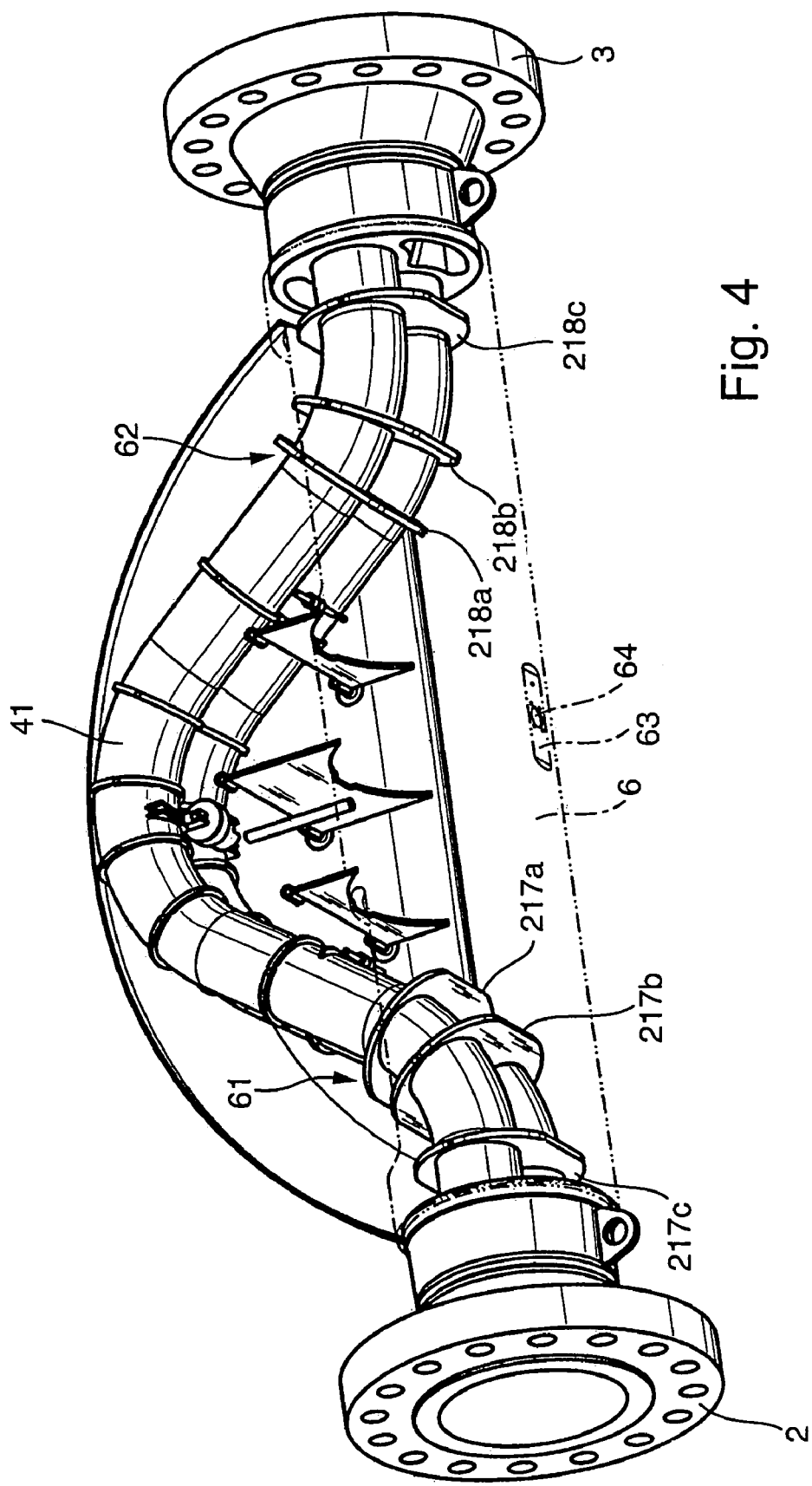
FIG. 4 is a partially sectioned side view of a measurement transducer of vibration-type having two transducer tubes and being suited for an inline measuring device as shown in FIGS. 1a, 1b.

FIGS. 2 to 4 show, in different types of illustrations, an example of an embodiment for a measurement transducer 1 of vibration-type serving especially as a Coriolis mass flow, density and/or viscosity meter. As already mentioned, the measurement transducer 1 serves especially for producing, in a medium flowing therethrough, mechanical reaction forces, especially Coriolis forces depending on mass flow, inertial forces depending on density of the medium, and/or frictional forces dependent on viscosity of the medium. These forces react measurably, especially sensorially registerably, on the measurement transducer. Derived from these reaction forces descriptive of the medium, e.g. mass flow, density and/or viscosity of the medium can be measured in manner known to those skilled in the art. Measurement transducer 1 is, during operation, inserted by means of flanges 2, 3 into the course of a pipeline (not shown), through which a medium to be measured is flowing, especially a powdered, liquid, gaseous or vaporous medium. Instead of flanges, the measurement transducer 1 can also be connected to the mentioned pipeline by other known means, for example, by means of triclamp connectors or screwed connections.

For conveying at least a volume portion of the medium to be measured, the measurement transducer includes at least a first transducer tube 4 communicating with the pipeline during operation and serving as measuring tube. The first transducer tube 4 is held oscillatably in a transducer housing 10 of the measurement transducer 1 and is caused, during operation, at least at times, to vibrate in an oscillatory mode suitable for determining the physical, measured variable. Additionally, the measurement transducer 1 includes a second transducer tube 5 extending essentially parallel to the transducer tube 4 and likewise vibrating, at least at times, during operation. Transducer tube 5 is arranged in the immediate vicinity of the first transducer tube and likewise accommodated in the transducer housing 1. In the example of an embodiment shown here, each of the two transducer tubes 4, 5 includes an at least sectionally bent tube segment 41, 51. The transducer tubes 4, 5 can, as also shown in U.S. Pat. No. 6,776,052, include tube segments having a marked U-shape, or, as proposed also in U.S. Pat. Nos. 6,802,224 or 6,711,958 and shown in FIGS. 2-4, be provided in essentially a V-shape. Additionally, the transducer tubes can, however, also as shown e.g. in U.S. Pat. No. 5,796,011 be bent only slightly, or, as shown e.g. in WO-A 01/65213, U.S. Pat. Nos. 6,308,580, 5,301,557, 6,092,429, 6,044,715 be bent more in the form of rectangular or trapezoidal shape or they can also, as required, be essentially straight. Suitable as material for the transducer tube are, depending on selected form of tube, especially steel, particularly high-grade steel, e.g. a stainless high-grade steel, titanium, zirconium, or tantalum. Beyond these, however, serving as material for the transducer tubes can also be practically any other material usually used therefor, or at least suited therefor.

There is, moreover, also the option available to provide also the second transducer tube 5 as a measuring tube, through which the medium to be measured flows, in addition to the first transducer tube 4. Alternatively to this, however, it is also possible, as proposed for instance also in U.S. Pat. Nos. 6,666,098 or 5,549,009, to apply only one of the two transducer tubes as the measuring tube serving for conveying the medium and to use the other as a blind tube to serve for decreasing intrinsic imbalances in the measurement transducer, but not flowed through by the medium to be measured. For the case in which both transducer tubes 4, 5 are to serve as measuring tubes, so that also the second transducer tube 5 is, as also evident from a comparison of the FIGS. 1b, 3 and 4, provided for conveying a volume portion of the medium to be measured, then the transducer tubes 4, 5 can, as indicated in the FIGS. 1b, 3 and 4, and as shown, for example, also in U.S. Pat. Nos. 6,711,958, 5,796,011, and 5,301,557, be connected together to flow paths flowed through in parallel during operation, by means of a first distributor piece 11 on the inlet side as well as a second distributor piece 12 on the outlet side; they can, however, also as shown e.g. in U.S. Pat. No. 6,044,715 be connected together serially to form flow paths lying one after the other. Furthermore, the transducer tubes 4, 5 are, at least for the case in which the two are to serve both as measuring tube, essentially identical in construction.

The two transducer tubes 4, 5 are, as is clearly evident from comparison of FIGS. 1a, b and 3, and as is also usual in the case of measurement transducers of such type, practically completely encased by the transducer housing 10. The transducer housing 10 serves, as a result, thus, not only for holding the transducer tubes 4, 5, but also, in addition to this, for protecting internally situated components of the measurement transducer 1, such as for example, the exciter mechanism and the sensor arrangement, and possibly, moreover, other components of the measurement transducer placed inside of the transducer housing, against external environmental influences, such as e.g. dust or water spray. Beyond this, the transducer housing 10 can furthermore be so embodied and so dimensioned that it can, up to a required maximum excess pressure, completely retain escaping medium in the interior of the transducer housing in the case of possible damage to the transducer tube 4 e.g. as a result of crack formation or bursting. Applied as material for the transducer housing, especially also the housing cap 7, can be e.g. steels, such as structural steel or stainless steel, or also other suited, high-strength materials. In a further embodiment of the measurement transducer, the at least one transducer tube 4, especially a transducer tube 4 at least sectionally bent, and the transducer housing can be, in each case, of the same material, especially steel or high-grade steel e.g. a stainless, high-grade steel, or at least materials similar to one another, especially various types of steel. Additionally, it can be of advantage to embody the flanges, as also shown in FIGS. 1*a, b* and as quite usual in the case of such measurement transducers, as integral components of the transducer housing, in order, in this way, to achieve as short an installed length as possible at a stability of the measurement transducer which is as high as possible; equally, also the possibly provided distributor pieces 11, 12 can be directly integrated into the transducer housing. In the example of an embodiment shown here, the transducer housing 10 is formed by means of a support element 6 (shown here as a support cylinder which is laterally at least partially open), which is embodied essentially more rigidly than the transducer tubes 4, 5 and which, as shown in FIGS. 2, 3, and 4, is so mechanically connected with the transducer tubes 4, 5 on the inlet side and the outlet side that the at least one bent (here essentially in V-shape) tube segment of each transducer tube 4, 5 protrudes laterally outwards.

Additionally, the transducer housing includes a housing cap arranged spaced at least from the bent tube segment of the transducer tube 4 and affixed to the support element 6, especially lastingly and/or medium-tightly, for at least housing the at least one bent tube segment of the at least one transducer tube 4. In the case of the example of an embodiment as illustrated, the transducer tubes 4, 5 are so held in the, here, tubular support element 6 on the inlet and outlet sides that the oscillatable tube segment 41, extending through two cutouts 61, 62 of the support element 6, protrude laterally out of such and consequently protrude into the housing cap 7, likewise, affixed to the support element 6. It is to be noted in such case, also, that, instead of the, here, more tubular support element 6, also an, as required, solid support cylinder with another suitable cross section can be used, for example a support element embodied more in the form of a beam.

Besides the transducer housing 10 and the transducer tubes 4, 5 held therein, the measurement transducer 1 further includes means 61, 62 acting electromechanically on the transducer tubes 4, 5, and reacting to mechanical oscillations of the transducer tubes 4, 5, for producing and/or maintaining mechanical oscillations of the transducer tubes 4, 5, or, as the case may be, for producing at least one oscillation measurement signal $s_{vb}$ representing oscillations of the transducer tubes 4, 5. According to an embodiment of the invention, the two transducer tubes 4, 5 (here extending at least sectionally parallel to one another) are excited to wagging-type vibrations, especially at a respective, instantaneous, mechanical, resonance frequency, wherein they are caused to oscillate essentially with opposite phase to one another, laterally deflected out of the above mentioned plane, in the manner of a tuning fork. In other words, the tube segments 41, 51 oscillate in a bending oscillation mode in the manner of cantilevers clamped on one end. The means 61, 62 for producing and/or registering oscillations are additionally, as usual in the case of such measurement transducers, electrically coupled in suitable manner with a measuring and operating circuit correspondingly provided in the measuring device electronics 20. The measuring and operating circuit, in turn, produces, on the one hand, an exciter signal $s_{xc}$ correspondingly driving the exciter mechanism 60, for example an exciter signal $s_{xc}$ controlled with respect to an exciter current and/or an exciter voltage. On the other hand, the measuring and operating circuit receives the at least one oscillation measurement signal $s_{vb}$ of the sensor arrangement 70 and generates therefrom desired measured values which can represent for an example, a mass flow, a density and/or a viscosity of the medium to be measured and which are, as required, displayed on-site or also, as required, further processed at a higher level.

The measuring device electronics 20, including the measuring and operating circuit, can be accommodated, for example, in a separate electronics housing 9, which is arranged remotely from the measurement transducer, or, for the purpose of forming a single compact device, directly affixed to the measurement transducer 1, for example, externally on the transducer housing 10. For holding the electronics housing 9, a neck-like transitional piece 8 can, for example, additionally be mounted on the transducer housing 10, this being also shown in FIGS. 1*a, b*. In FIGS. 2 to 4, however, the transitional piece 8 is omitted; solely in FIG. 4, a seating surface 63 for the transitional piece 8 is shown, recessed in a wall of the transducer housing 10. In the seating surface 63, an electrical feedthrough 64 is arranged, by means of which electrical connections to the exciter mechanism 60 and to the sensor arrangement 70, as well as to, as required, further electric components, such as e.g. pressure and/or temperature sensors provided, as required, in the measurement transducer 1, can be made.

The two transducer tubes 4, 5 are, as shown in FIGS. 2 to 4 and as quite usual in the case of such measurement transducers, mechanically coupled together by means of at least a first, inlet-side, coupling element 217*a* affixed thereto and by means of a first, outlet-side, coupling element 218*a* affixed thereto. The measurement transducer illustrated by way of example includes moreover yet second and third, inlet-side, coupling elements 217*b*, 217*c*, as well as second and third, outlet-side, coupling elements 218*b*, 218*c*. By means of such coupling elements, 217*a*, 217*b*, 217*c*, 218*a*, 218*b*, 218*c*, embodied, for example, in plate shape, on the one hand, conventionally, mechanical eigenfrequencies of the two transducer tubes 4, 5 are purposefully influenced, be it by their dimensioning, and/or by their positioning, on the two transducer tubes 4, 5. On the other hand, in this way, mechanical stresses and/or vibrations possibly or at least potentially caused by the vibrating transducer tubes on the inlet side or outlet side, also in the transducer housing, can be minimized.

Figure 5A:
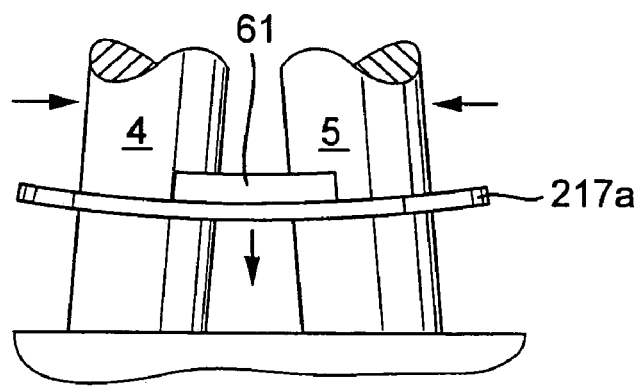
FIGS. 5a-5c show oscillatory movements of transducer tubes of FIGS. 2 to 4 as well as deformations of a coupling element connecting the transducer tubes mechanically together, as associated with the oscillatory movements.
Figure 5B:
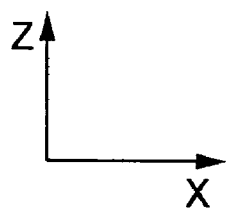
Figure 5B:
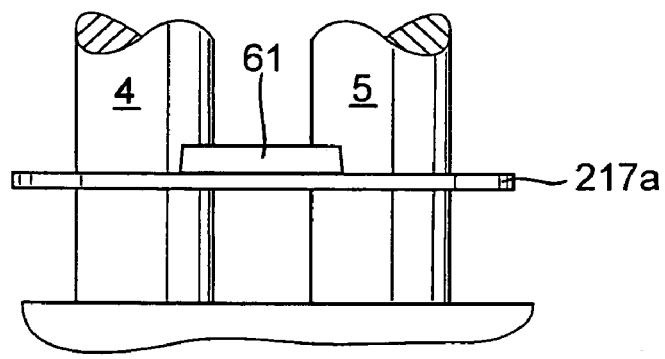
Figure 5C:
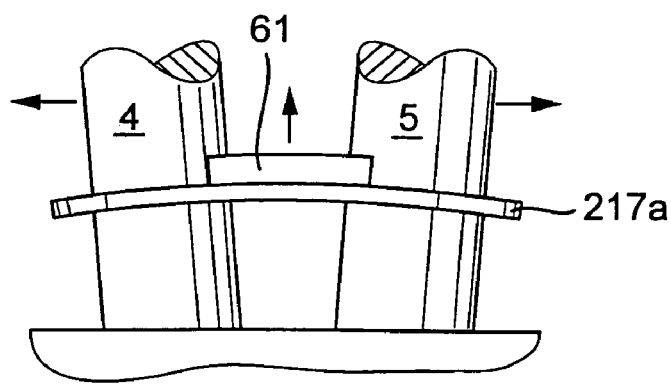

On the basis of their connection with the two transducer tubes 4, 5, both the first inlet-side coupling element 217*a* as well as also the first outlet-side coupling element 218*a* are subjected during operation repeatedly to deformations corresponding with the vibrations at least of one of the two transducer tubes 4, 5. The deformations of the coupling elements can in such case assume, for example, the characteristics demonstrated in FIGS. 5*a-c* on the basis of the first coupling element 217*a*. As illustrated, the deformations to which at least each of the innermost two coupling elements 217*a*, 218*a*, are subjected to repeatedly during operation, are at least partially developed in a manner such that oscillatory movements of the particular coupling element corresponding therewith are directed at least partially transversely to a direction of oscillation of the two vibrating transducer tubes 4, 5. In the case of the measurement transducer of the example of the embodiment, the oscillatory movements of the transducer tubes 4, 5 run essentially in the X-direction, while the aforementioned oscillatory movements of the coupling elements have especially also a component in the Z-direction running transversely thereto. In the case of the deformations to which each of the coupling elements is repeatedly subjected, these are, as clearly recognizable, essentially transverse-force-free bendings.

It has now additionally been found that the above described deformations, at least of the coupling elements 217a, 217b, are so developed that, directly on the basis of these deformation movements, also the oscillatory movements of the transducer tubes themselves are very robustly and well reproducibly detectable. Conversely, it is, however, also possible to deflect the transducer tubes in the above described manner, at least via the coupling elements 217a, 217b, and, consequently, also to excite the mentioned bending, or wagging, oscillations. In the case of the measurement transducer of the invention, consequently, additionally at least a first transducer element 61 is provided, which is, at least mediately, mechanically coupled with at least one of the named coupling elements 217a, 217b, 217c, 218a, 218b, 218c, for example, the coupling element 217a.

The at least one transducer element 61 can serve, therefore, for converting electrical energy into mechanical energy and/or, conversely, mechanical energy into electrical. For such purpose, coupling element 217a and transducer element 61 are so mechanically coupled together (for example, essentially rigidly connected together) that also the transducer element 61 executes, at least in part, oscillatory movements, which correspond with the repetitive deformations at least of this coupling element 217a and, as a result, also with those of the transducer tubes 4, 5. In an embodiment of the invention, the first transducer element 61 is so coupled with the one of the at least two coupling elements 217a, 218a, that the transducer element 61 executes, at least in part, oscillatory movements which are essentially of equal phase with deformation movements of a section of the same coupling element located between the two transducer tubes 4, 5. For this purpose, the transducer element 61 is advantageously essentially rigidly connected with this section of the coupling element located between the two transducer tubes 4, 5.

According to a further embodiment of the invention, it is a purpose of the transducer element 61 to excite, at least at times, oscillations of the transducer tubes 4, 5. Alternatively or in supplementation thereof the transducer element according to a further embodiment of the invention is provided for registering, at least at times, oscillations of the transducer tubes 4, 5. For improving the effectiveness of the transducer element 61 and/or for direct differential registering and/or exciting of locationally different oscillations, in a further embodiment of the invention, the transducer element and two of the coupling elements 217a, 217b, especially two neighboring coupling elements, are, at least mediately, mechanically coupled together.

In the case of the at least one transducer element 61, such can involve for example a solenoid arrangement wherein the at least one transducer element 61 includes an armature of magnetic material mechanically coupled with one of the coupling elements, as well as a coil mechanically coupled with another of the coupling elements. In the case of this embodiment of the transducer element, armature and coil are correspondingly penetrated, at least in part, by a magnetic field. At least for the case in which the transducer element 61 is to be used solely as means for registering oscillations of the transducer tubes, such can also be embodied by means of a strain gauge affixed to the coupling element 217a.

In another embodiment of the invention, the transducer element 61 includes at least one deformation body 61a made, at least in part, of a piezoelectric material. Instead of a single deformation body 61a of the kind being discussed, in case required, however, also two or more of such deformation bodies 61a, 61b, of piezoelectric material can in each case be applied for implementing individual transducer elements. Different variants for implementing such a transducer element having at least one deformation body at least partially made of piezoelectric material are shown by way of example in FIGS. 6a-f.

Figure 6A:
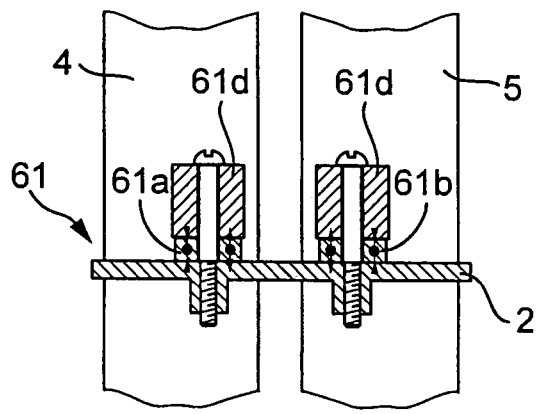
FIGS. 6a-6f show various examples of embodiments for an electromechanical transducer element having deformation bodies made, at least in part, of piezoelectric material and serving for the production and/or registering of mechanical oscillations of transducer tubes of a measurement transducer of vibration-type.
Figure 6B:
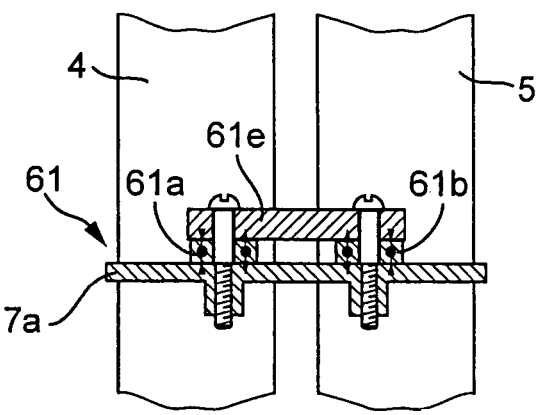
Figure 6C:
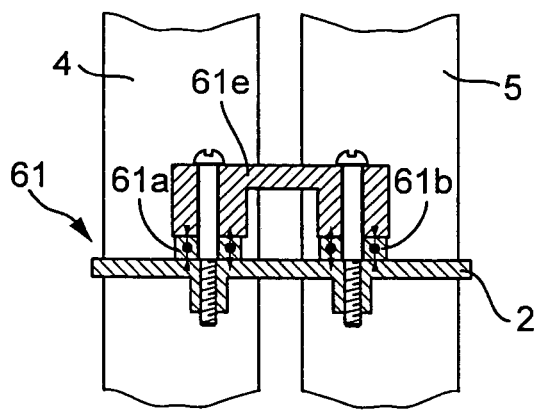
Figure 6D:
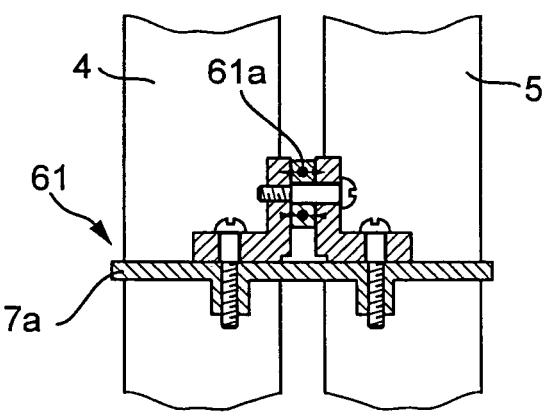
Figure 6E:
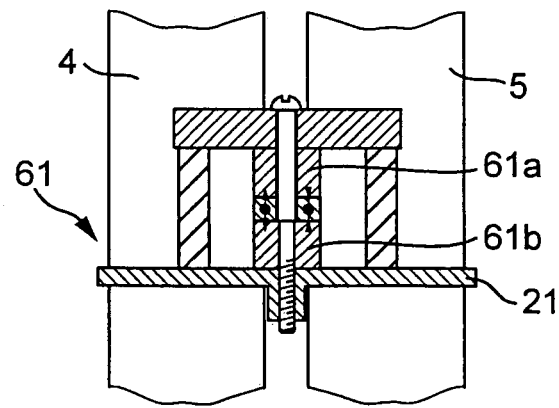
Figure 6F:
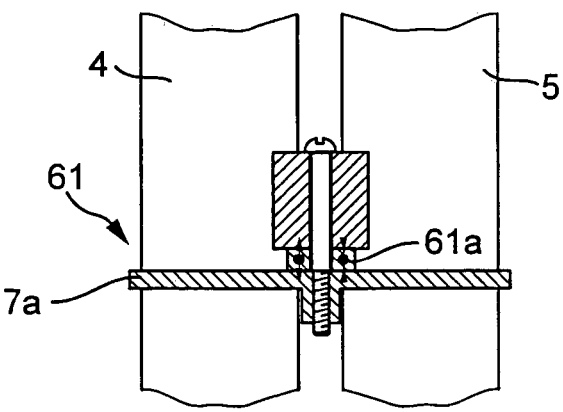

In the examples of embodiments shown in FIGS. 6a-f, the transducer element can be so embodied that it includes at least one such deformation body 61 of piezoelectric material, which, as shown in FIG. 6d or e, is clamped in a clamping apparatus placed on the first coupling element 217a and/or incorporated therein. For this embodiment, in certain cases, also the use of only a single deformation body would be sufficient. In contrast, in the case of the examples of embodiments shown in FIGS. 6a, b, and c, in each case at least two deformation bodies 61a, 61b are provided. In FIG. 6a, each of the two deformation bodies 61a, 61b of the transducer element is connected both with the associated coupling element as well as also on a side facing away from the coupling element 217a with its own mounting block 61c, 61d acting as seismic masses, while, in FIGS. 6b and c, the two deformation bodies 61a, 61b placed correspondingly on the coupling element 217a are essentially rigidly connected together on a side facing away from the coupling element in each case by means of a largely bend-proof connecting piece 61e. The connecting piece 61e can, as shown schematically in FIG. 6b, be formed, for example, with beam shape or have a disc shape. It can, however, for example, also be embodied as indicated in FIG. 6c in the form of a bridge-shaped connecting piece. It is to be noted here that the transducer element 61, although it has been shown in FIGS. 2 and 3, as well as also in the FIGS. 6a-6f always as spaced away from an intermediate space formed between the two transducer tubes and, consequently, spaced also from a tube plane imaginarily cutting one of the two transducer tubes 4, 5, in case required, can also be placed between the two transducer tubes 4, 5, to the extent that these have a separation from one another sufficiently large therefore.

For the affixation of the respective deformation bodies 61a, 61b, and the, in each case, associated mounting blocks 61c, 61d, or the associated connecting piece 61e, as the case may be, to the coupling element 217a, for example, solder, braze, or adhesive connections can be used depending on choice of material pairings. Alternatively or in supplementation thereof, threaded connections can serve, implemented by means of bolts affixed correspondingly to the respective coupling element, bolts which are, in the case shown here, essentially perpendicularly and centrally arranged thereon. By means of a clamping nut correspondingly screwed onto the end of the bolt and consequently acting as a counter bearing for the deformation body 61a, a corresponding prestress can be produced, especially a prestress compensating various length expansions of deformation body, coupling element, and bolt associated with temperature fluctuations, so that the transducer element 61 is able to generate and/or detect oscillatory movements on both sides of a static rest position. In case required, the two deformation bodies 61a, 61b, and the connecting piece affixed thereto in each case on the ends, or as the case may be, the mounting blocks

61*c*, 61*d*, affixed thereto in each case on the ends can, however, also be realized as an essentially homogenous, one-piece, molded article.

FIGS. 7*a* and *b* show, by way of example, embodiments for the construction, in principle, of a piezoelectric deformation body of the described kind. The deformation body 61*a* shown here is a disc, here of circular shape, formed by means of two mutually bordering segments, wherein the segments have polarizations opposite to one another (here symbolized by "+" and "−"). For the traversing of the components serving for the affixing of the deformation body and/or for the electrical connecting of the segments, the deformation body 61*a* shown in FIG. 7*b* is provided with a corresponding bore; it is, here, however, also possible to provide two or more such bores in the deformation body.

FIGS. 8*a* and *b* show how, for example, a stack formed by means of two piezoelectric deformation bodies 61*a*, 61*a*' of the described kind excites a shaped piece affixed on the end thereof, for example, the mentioned mounting block 61*c* or the mentioned connecting piece 61*e*, directly to wagging oscillations. The enlarged detail section A (FIG. 8*b*) shows the region around the stack. If an electric alternating voltage is placed on the electrically conductive contact electrodes 61*g* (the contact electrodes are not shown in the enlarged detail section), then the stack forming the transducer element 61*a* is subjected on the one or the other side to contractions while on the, in each case, opposite side of the stack expansions are experienced. As a result of this, by means of the stack, an alternating, wagging movement is directly transmitted onto the shapeded piece 61*c* or 61*f*, as the case may be, affixed to the end and there, depending on the clamping situation transformed into a wagging oscillation or a bending oscillation. In the present example, the wagging movement is executed in a plane which is perpendicular to the connecting plane of stack and shaped piece. Conversely, from oscillations introduced into the stack forming the transducer element 61*a* via coupling element 217*a*, corresponding alternating voltages can be induced in the stack, which can be tapped by means of the contacting element 61*e*. An advantage of such a stack 5 lies in the fact that a stack formed from individual flat piezoelectric deformation bodies can be manufactured more price favorably than a single piezoelectric deformation body of equal height.

FIGS. 9*a* and *b* show schematically how two piezoelectric deformation bodies 61*a*, 61*a*' of the described kind can be arranged and electrically contacted so that a corresponding stack results such as is illustrated in FIG. 8*a*. The two deformation bodies 61*a*, 61*a*' are in such case so arranged that, as indicated, segments having, in each case, equal polarization lie opposite one another. For electric connecting of the transducer element 61 formed as a result, contact electrodes 61*g* are provided, correspondingly galvanically connected with the individual segments. The contact electrodes 61*g* are provided, for example, in each case in the form of solder flags. Of these contact electrodes 61*g* two mutually connected ones thereof are located on the two external surfaces of the stack. A third of the electrically conductive contact electrodes 61*g* is arranged between the two deformation bodies. The contact electrodes 61*g* are, in such case, so arranged on the stack and so connected with it that the individual segments within the stack are connected essentially in an electrically antiparallel manner. The contact electrodes 61*g* provided on the transducer element 61 can be e.g. adhered by adhesive, soldered, brazed, or welded with the respective deformation bodies 61*a*, 61*a*'.

Figure 10:
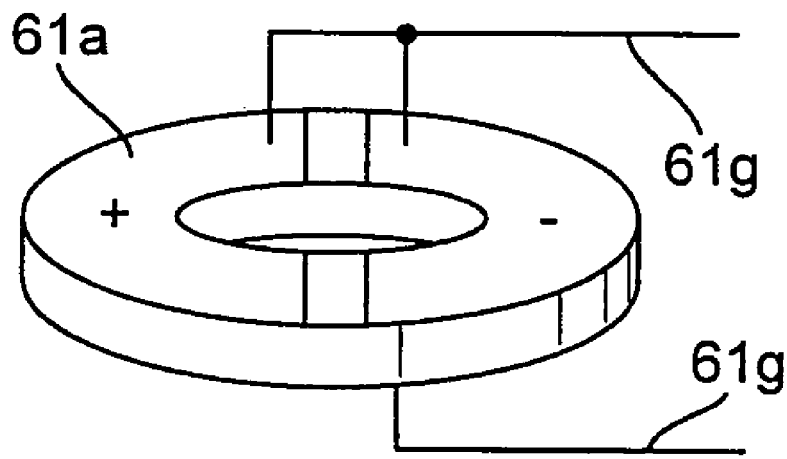
FIG. 10 show various force-signal constellations such as can arise in the case of a piezoelectric deformation body according to FIG. 8a or 8b.

FIG. 10 illustrates another advantage of a transducer element of the described kind, implemented in the manner shown in FIGS. 9*a*, *b*, by means of polarized, piezoelectric, deformation bodies 61*a*, 61*a*'. Illustrated is a stack composed of two separate deformation bodies 61*a*, 61*a*', with two electrodes 61*g*. Below is presented the relationship between forces acting on these deformation bodies in different ways (indicated by the arrows) and the associated alternating voltage. As can be seen from this presentation, symmetric forces/movements in each case mutually cancel in their effect and thus produce no signal. Only wagging movements of the described kind on the outer side of the piezoelectric deformation bodies cause, on the basis of the mutually opposing polarizations of the individual segments, an electric signal, or convert such, as the case may be. The wagging movement is a movement which can be decomposed e.g. into the two force components, compression and tension. The electric signal is here referenced with $2*E$, because from the forces which act above and below on the stack, an electric potential twice as large results as compared in the case of the force by the wagging movement only on one side. Besides the improved efficiency, such a deformation body is additionally also largely insensitive to a multiplicity of external disturbing forces.

Figure 11:
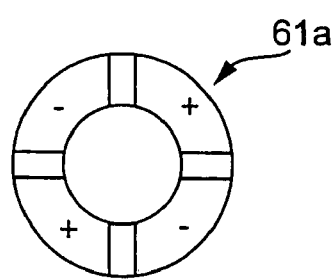
FIG. 11 show a construction of a piezoelectric deformation body having four pairwise differently polarized segments and a central bore.
Figure 12:
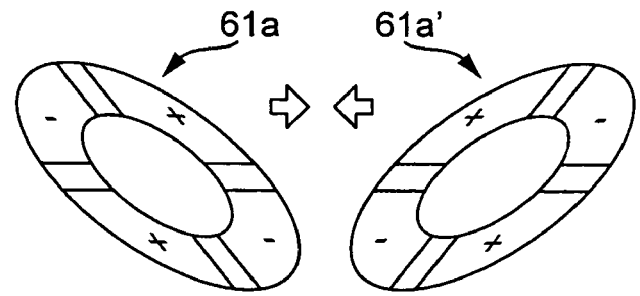
FIG. 12 show an arrangement option of two piezoelectric deformation bodies of FIG. 11 for a stack.
Figure 13:
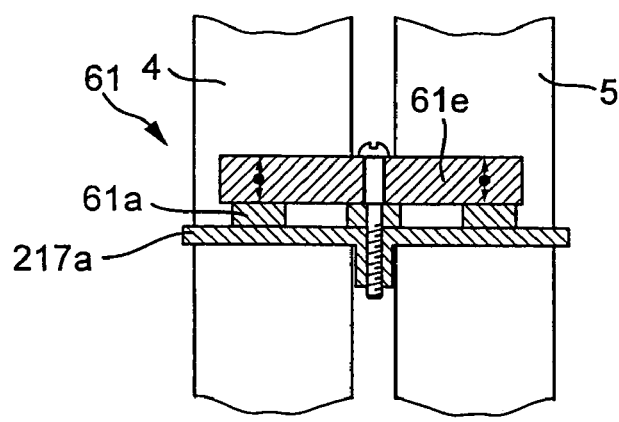
FIG. 13 show a transducer element having a deformation body according to FIG. 12.

Although in the case of the examples of embodiments shown in FIGS. 6*a-f*, in each case, only deformation bodies 61*a*, 61*a*' with solely two segments of different polarization are shown, it can be quite advantageous in practicing the invention practically to employ transducer elements which are implemented by means of two or more segments of different polarization such as are shown by way of example in FIGS. 11 to 13. Thus in FIG. 11, in a plan view onto a corresponding outer surface, an example of an embodiment is shown for a piezoelectric deformation body of the described kind, which has four segments. The polarizations of the segments and thus, accordingly, the force components to be produced and/or to be received in each case, therewith, are, as schematically shown, in each case, pairwise identical, with the polarizations of neighboring segments alternating.

An option for joining together two of such piezoelectric deformation bodies 61*a*, 61*a*' to a stack is shown in FIG. 12. There, as already mentioned in connection with FIGS. 8*a*, *b*, equally polarized segments lie opposite to one another. Such a deformation body, 61*a*, 61*a*', formed by means of four segments is suited, for example, also for the implementing of a transducer element 61 according to the examples of embodiments presented in FIGS. 6*a*, 6*b*, 6*c*, or 6*f*. with, in each case, bolts with tensioning nuts affixed to the coupling element 217*a*. A further example for a transducer element 61 correspondingly using the aforementioned stack is shown schematically in FIG. 13. The transducer element 61 formed by means of the stack is in turn secured to the coupling element 217*a*. This can advantageously also be implemented in such a manner that the transducer element, as already mentioned, is placed between the two transducer tubes 4, 5.

According to a further development of the invention, it is additionally provided that the measurement transducer, besides the first transducer element 61, includes at least a second transducer element 62 for converting electrical energy into mechanical and/or vice versa. In corresponding manner, in such case, also the second transducer element 62 and one of the coupling elements 218*a* (here the one nearest to the middle on the outlet side) are at least mediately mechanically coupled together in such a manner that also the second transducer element 62, at least partially executes oscillatory movements which correspond with the repeated deformations of the same coupling component. Advantageously, in such case, the at least two transducer elements 61, 62, are embodied identically or at least essentially with equal construction. According to a further embodiment of this further development of the invention, the first transducer element 61 is mechanically coupled with at least the first inlet side coupling element 217*a* and the second transducer element 62 with at least the first outlet side coupling element 218*a*. Consequently, the deformations imposed on the first transducer element 61, as well as also the electric voltages supplied thereto, correspond with the inlet-side, oscillatory movements of the transducer tubes, and, in corresponding manner, the deformations imposed on the second transducer element 62, as well as also the electric voltages applied thereto, correspond with the outlet-side oscillatory movements of the transducer tubes 4, 5. Additionally, at least in the case of essentially identical transducer elements 61, 62 arranged symmetrically about the center, their sensitivity to the deformation movements, and, as a result, to the oscillations of the transducer tubes, as well as also the sensitivity to the corresponding exciter signals, are essentially equally large.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A measurement transducer of a vibration-type for measuring a flowable medium conveyed in a pipeline, comprising:
    at least two oscillatably held, transducer tubes vibrating, at least at times, during operation, of which at least a first transducer tube, serving for conveying at least a volume portion of the medium to be measured, communicates with the pipeline; and
    at least a first transducer element for converting electrical energy into mechanical energy and/or vice versa; wherein:
    said at leaste two oscillatably held transducer tubes are mechanically coupled together by means of at least a first, inlet-side, coupling element and by means of at least a first, outlet-side, coupling element in such a manner that both said first, inlet-side, coupling element, as well as said first, outlet-side, coupling element, are repeatedly subjected during operation to deformations which correspond with vibrations at least of one of said at least two oscillatably held transducer tubes; and
    said at least a first transducer element and said at least one of the coupling elements are at least mediately coupled mechanically together in such a manner that said at least a transducer element executes, at least in part, oscillatory movements which correspond with the repeated deformations at least of said coupling element.

2. The measurement transducer as claimed in claim 1, wherein:
    the deformations to which each of said at least two coupling elements are repeatedly subjected to during operation are at least partially developed in such a manner that oscillatory movements of the respective coupling elements corresponding therewith are directed, at least in part, transversely to a direction of oscillation of said two vibrating transducer tubes.

3. The measurement transducer as claimed in claim 2, wherein:
    said first transducer element is essentially rigidly connected at least with the one of said at least two coupling elements.

4. The measurement transducer as claimed in claim 1, wherein:
    each of said two coupling elements is embodied as a node plate fixed in each case to said two transducer tubes.

5. The measurement transducer as claimed in claim 4, wherein:
    the deformations, to which each of said two coupling elements are repeatedly subjected, are essentially transverse-force-free bendings.

6. The measurement transducer as claimed in claim 1, wherein:
    said first transducer element is coupled with the one of said at least two coupling elements in such a manner that said first transducer element executes, at least in part, oscillatory movements which are essentially equal in phase with deformation movements of a section of the same coupling element, which section is located between said two transducer tubes; and/or
    said first transducer element is coupled with the one of said at least two coupling elements in such a manner that it is essentially rigidly connected with the section located between said two transducer tubes.

7. The measurement transducer as claimed in claim 1, wherein:
    said two transducer tubes additionally are mechanically coupled together by means of at least a second inlet-side coupling element and by means of at least a second outlet-side coupling element.

8. The measurement transducer as claimed in claim 7, wherein:
    said first transducer element and two of said coupling elements, are, at least mediately, mechanically coupled together.

9. The measurement transducer as claimed in claim 1, wherein:
    said first transducer element includes an armature of magnetic material mechanically coupled with one of said coupling elements, as well as a coil mechanically coupled with another of said coupling elements; and
    said armature and said coil are penetrated, at least partially, by a magnetic field.

10. The measurement transducer as claimed in claim 1, wherein:
    said first transducer element includes at least one deformation body comprised, at least in part, of piezoelectric material.

11. The measurement transducer as claimed in claim 10, wherein:
    said first transducer element includes at least two deformation bodies comprised, at least in part, of piezoelectric material, the deformation bodies which are placed on said first coupling element, and the deformation bodies are coupled with seismic masses on a side facing away from said coupling element and/or are essentially rigidly connected together by means of a largely bend-proof connecting piece.

12. The measurement transducer as claimed in claim 10, wherein:
    said first transducer element includes at least one deformation body comprised, at least in part, of piezoelectric material and clamped in a clamping apparatus placed on, and/or incorporated in, said first coupling element.

13. The measurement transducer as claimed in claim 1, further comprising:

a first distributor piece connecting said first and second transducer tubes together on the inlet side, as well as a second distributor piece connecting said first and second transducer tubes together on the outlet side.

14. The measurement transducer as claimed in claim 1, further comprising:

a support element, especially an essentially rigid support element, wherein at least one of said two transducer tubes is mechanically connected with said support element on the inlet side and on the outlet side.

15. The measurement transducer as claimed in claim 14, wherein:

said support element is embodied as a support cylinder, especially an essentially tubular support cylinder.

16. The measurement transducer as claimed in claim 1, wherein:

each of said two transducer tubes includes, in each case, at least one bent tube segment, especially an essentially U- or V-shaped, bent tube segment; and/or said two transducer tubes are embodied essentially identically to one another and extend essentially parallel to one another.

17. The measurement transducer as claimed in claim 1, wherein:

said first transducer element serves, at least at times, as an oscillation exciter for producing and/or maintaining, at least at times, mechanical oscillations of at least the first transducer tube; and/or said first transducer element serves, at least at times, as an oscillation sensor for producing, at least at times, at least one oscillation measurement signal representing at least the oscillations of at least one of said transducer tubes.

18. The measurement transducer as claimed in claim 1, further comprising:

at least a second transducer element for converting electrical energy into mechanical and/or vice versa, wherein:

said second transducer element and one of said coupling elements are coupled mechanically together, at least mediately, in such a manner that said second transducer element executes at least in part, oscillatory movements, which correspond with the repeated deformations of the same coupling element.

19. The measurement transducer as claimed in claim 18, wherein:

said first transducer element is mechanically coupled with at least the first, inlet-side, coupling element and said second transducer element is mechanically coupled with at least the first, outlet-side, coupling element.

20. The measurement transducer as claimed in claim 19, wherein:

said first transducer element and said second transducer element are essentially of equal construction.

21. The use of the measurement transducer as claimed in claim 1, in an inline measuring device, especially a Coriolis mass-flow measuring device, a density measuring device, and/or a viscosity meter, serving for measuring a medium flowing in a pipeline.

* * * * *